May 9, 1967 W. H. HOLCROFT 3,318,591
BATCH TYPE ROTARY BARREL GAS ATMOSPHERE FURNACE
Filed Sept. 28, 1964 7 Sheets-Sheet 1

FIG. 1

INVENTOR
WALTER H. HOLCROFT
BY
Whittemore, Hulbert
& Belknap
ATTORNEYS

May 9, 1967  W. H. HOLCROFT  3,318,591
BATCH TYPE ROTARY BARREL GAS ATMOSPHERE FURNACE
Filed Sept. 28, 1964  7 Sheets-Sheet 4

INVENTOR
WALTER H. HOLCROFT
BY Whittemore, Hulbert
& Belknap
ATTORNEYS

May 9, 1967 W. H. HOLCROFT 3,318,591
BATCH TYPE ROTARY BARREL GAS ATMOSPHERE FURNACE
Filed Sept. 28, 1964 7 Sheets-Sheet 5

INVENTOR
WALTER H. HOLCROFT
BY
Whittemore, Hulbert
& Belknap
ATTORNEYS

May 9, 1967  W. H. HOLCROFT  3,318,591
BATCH TYPE ROTARY BARREL GAS ATMOSPHERE FURNACE
Filed Sept. 29, 1964  7 Sheets-Sheet 6

INVENTOR
WALTER H. HOLCROFT
BY Whittemore, Hulbert
& Belknap
ATTORNEYS

May 9, 1967 W. H. HOLCROFT 3,318,591
BATCH TYPE ROTARY BARREL GAS ATMOSPHERE FURNACE
Filed Sept. 28, 1964 7 Sheets-Sheet 7

INVENTOR
WALTER H. HOLCROFT
BY
ATTORNEYS 3,318,591
BATCH TYPE ROTARY BARREL GAS
ATMOSPHERE FURNACE
Walter H. Holcroft, Detroit, Mich., assignor to Holcroft
& Company, Detroit, Mich., a corporation of Michigan
Filed Sept. 28, 1964, Ser. No. 399,571
20 Claims. (Cl. 263—34)

This invention relates to a heat treating furnace or appaatus of the rotary retort type and relates more particularly to a batch type rotary barrel or retort gas atmosphere furnace particularly adapted for automation. With such a construction a controlled gas atmosphere is circulated through articles or parts to be heat treated located in the rotary retort of the furnace. Thereafter, upon completion of a predetermined time interval, the furnace and retort undergo a gradual change in axial inclination to discharge the parts into a quench tank. Use of a controlled gas atmosphere to envelope the work in process enables the heat treater to closely control the surface appearance as well as the chemical and physical properties of the work.

Heat treating apparatuses of the type described for carburizing small articles or parts have been used in the art with some difficulty. The prior art illustrates an alloy retort heated externally, with the retort extending longitudinally through the heating chamber of the furnace and supported and driven externally of the heating chamber. One end of the retort is provided with a removable plug for loading and unloading the retort from the same end. In addition both may be provided with insulated plugs. The last mentioned apparatus operates on the so-called "batch" operation in which a load of parts to be heat treated is placed in the alloy retort through the loading end thereof and one of the insulated plugs is used to seal the loading end of the retort. The heating chamber and retort are rotated longitudinally and on completion of the heating cycle the other insulated plug is removed from the unloading end of the retort to discharge the load of parts.

The prior art further discloses a second type of heat treating apparatus comprising an alloy retort supported externally of the heating chamber, with the retort having an internal screw to propel the load through the retort and slots in the wall thereof to discharge the load. The De Coriolis Patent No. 2,898,099 describes some of the difficulties inherent in the operations of the second type of heat treating apparatus just described, namely, that the tumbling of parts being heat treated is limited due to the lead of the internal screw. The size of the retort is also limited by the requirement of support outside of the heating chamber. In addition, the control of the gas atmosphere inside of the retort is limited by these same factors.

In order to overcome certain of the problems mentioned heretofore, I invented a heat treating furnace comprising a retort with an internal screw, said retort being located entirely within the heating chamber and supported on and driven by a pair of rollers as is more fully described and claimed in my copending application U.S. 124,417, filed July 17, 1961, now Patent No. 3,176,970 dated Apr. 6, 1965. In my copending application the rollers may be supported on bearings located externally of the heating chamber or the rollers may be split longitudinally with an internal bearing and driven from each end. Also the split rollers may be connected by articulated means with internal bearings to provide even longer support. Thus, I have eliminated one previous objection relative to size of unit available. By having both ends of the retort open within the heating chamber I am able to control the flow of gas atmosphere. Also the retort does not require slots therein for discharging the heat treated parts.

However, the apparatus described in my copending application is still faced in certain instances with the problem of lack of mixture of the parts during the limited rotation of the retort. While certain parts are produced satisfactorily according to the teachings of my copending application it has been found that such structure is not suitable where dense loading of parts is necessary requiring a tumbling action which I am able to achieve with longitudinal pieces inside the retort. The present invention overcomes certain of the aforementioned problems by providing a heat treating apparatus which is particularly adapted for automation and for control of the effect of atmosphere on the parts both through tumbling of the parts and variation in the carbon potential of the atmosphere.

It is an object of the present invention to provide in a furnace for heat treating parts in a controlled atmosphere, the combination of a base, a substantially gas-tight heating chamber having an axis, means pivotally mounting the chamber on the base, a retort located within the chamber, means mounting the retort for rotation, and power operated means for changing the axial inclination of the chamber and the retort with respect to the support.

Another object of the present invention is to provide a furnace of the aforementioned type wherein first means are provided for frictionally driving the retort in rotation and second means are provided for driving the retort in rotation upon slippage occurring between the retort and the first means.

Still another object of the present invention is to provide a furnace of the aforementioned type wherein the first means comprises a rotatable support mounted in the chamber in friction driving engagement with the retort.

A further object of the present invention is to provide a furnace of the aforementioned type wherein the second means comprises a rotary rack attached to the retort and a sprocket mounted in the chamber in meshed engagement with the rack.

A still further object of the present invention is to provide a furnace of the aforementioned type wherein the second means comprises a pair of rotary racks attached to the ends of the retort and a pair of sprockets mounted in the chamber, one sprocket in meshed engagement with each rack.

Another object of the present invention is to provide a heat treating furnace of the aforementioned type which eliminates the use of a rotary retort as a structural member therein and the requirement that the retort be made by an expensive casting technique. As a result thereof the retort may be made of a relatively light rolled alloy with welded construction, thereby saving in construction costs and also lessening the resistance to the inward passing of heat.

Still another object of the present invention is to provide a heat treating apparatus of the aforementioned type which is simple in construction, easy to maintain and economical to manufacture.

Further objects and advantages of the present invention will be apparent from the following description, reference being had to the accompanying drawings wherein a preferred form of the present invention is clearly shown.

FIGURE 6 is a rear end view of the heat treating apparatus looking in the direction of arrows 6—6 of FIGURE 3.

Referring now to the drawings, the heat treating apparatus is designated by the numeral 10 and includes a pair of pedestals 12 and 14 forming a base. The bottom portions of the pedestals 12 and 14 are connected by channel-shaped supporting braces 16. A furnace 20 defining the heating chamber 22 comprises a relatively thin metal casing 24 having on the inner periphery and at the ends thereof suitable insulation. The casing 24 includes a cylindrical body having end plates welded to the body to provide a gas-tight enclosure. Adjacent the inner surface of the casing 24 is insulation 26 which is backed up by insulating fire brick 28 which is capable of withstanding high temperature within the heating chamber 22. The furnace 20 is elongated and of cylindrical configuration and as such has a longitudinally extending axis 29. The furnace 20 includes front and rear end walls 30 and 32 respectively which as mentioned previously are each provided with insulation.

The furnace 20 is provided on the outer periphery thereof and centrally located with respect to the ends thereof with a pair of laterally extending trunnions 34 and 36 which are received in bearings 38 and 40 respectively which are carried by the top surfaces of the pedestals 12 and 14 respectively as illustrated in FIGURE 6. With such a construction the furnace 20 is spaced above the ground surface or floor and is adapted to be moved in a direction to change the axial inclination thereof by suitable driving means to be subsequently described. Inasmuch as the overall structure is very well balanced, power for the driving means is minimal.

Extending axially of and located within the furnace 20 is a pair of elongated tubular drive rolls or rollers 42 and 44. The rollers 42 and 44 are provided with extensions on opposite ends thereof which extend through openings provided in the end walls 30 and 32 of the furnace 20. Specifically the rollers 42 and 44 are of substantially equal length and of uniform diameter, with the exception that the end portions 46 of the rollers are outwardly tapered or conically shaped and terminate in annular collars 48. The conically shaped end portions 46 and collars 48 are received in corresponding openings provided in the insulation of end walls 30 and 32.

Figure 8:
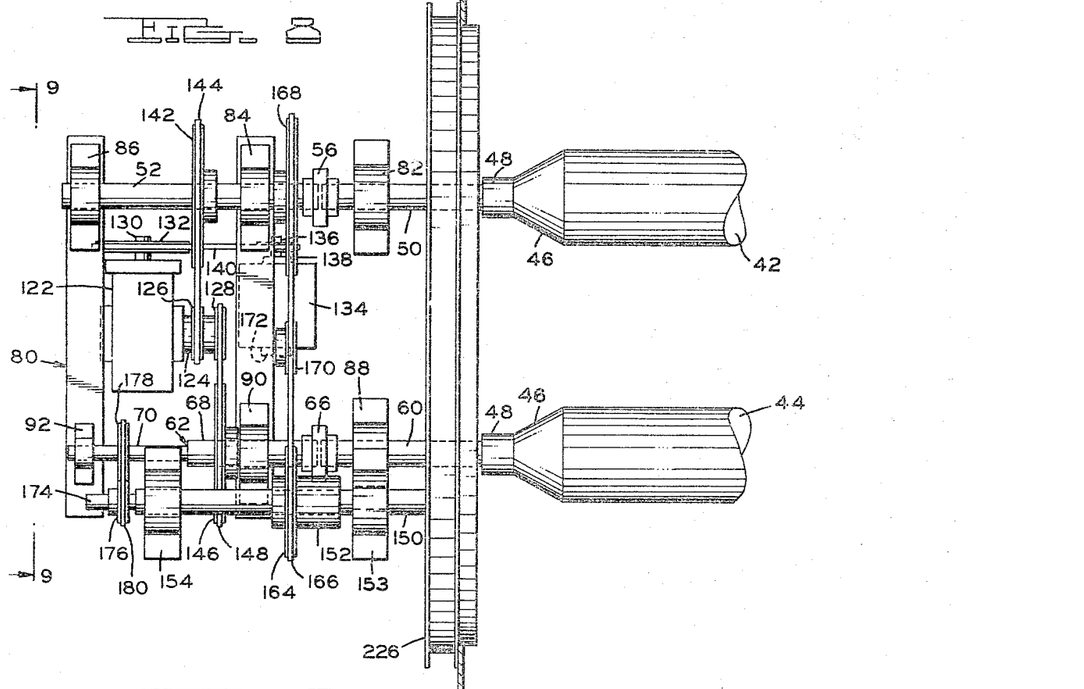
FIGURE 8 is a plan view of the left-hand edge portion of the apparatus shown in FIGURE 1 but on a scale larger than the scale of FIGURE 1, and with certain parts removed to illustrate features of the invention.
Figure 10:
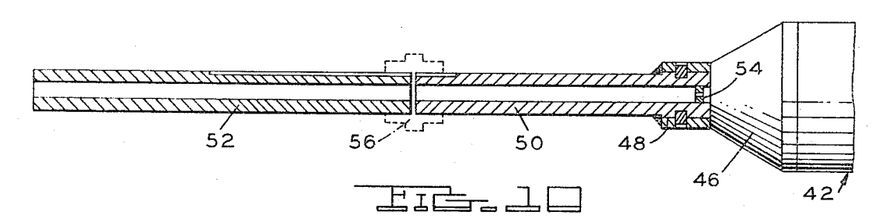
FIGURE 10 is a fragmentary elevation, partly in section, of the left-hand roller and its extension.

The left end of roller 42 as illustrated in FIGURES 8 and 10 is provided with a pair of axially aligned tubular extensions 50 and 52 of substantially equal diameters. The right end of extension 50 is appropriately mounted within and secured to collar 48 and is provided on the interior thereof with a plug 54. The tubular extension 52 is appropriately connected to and aligned with extension 50 by means of a coupling 56.

Figure 1:
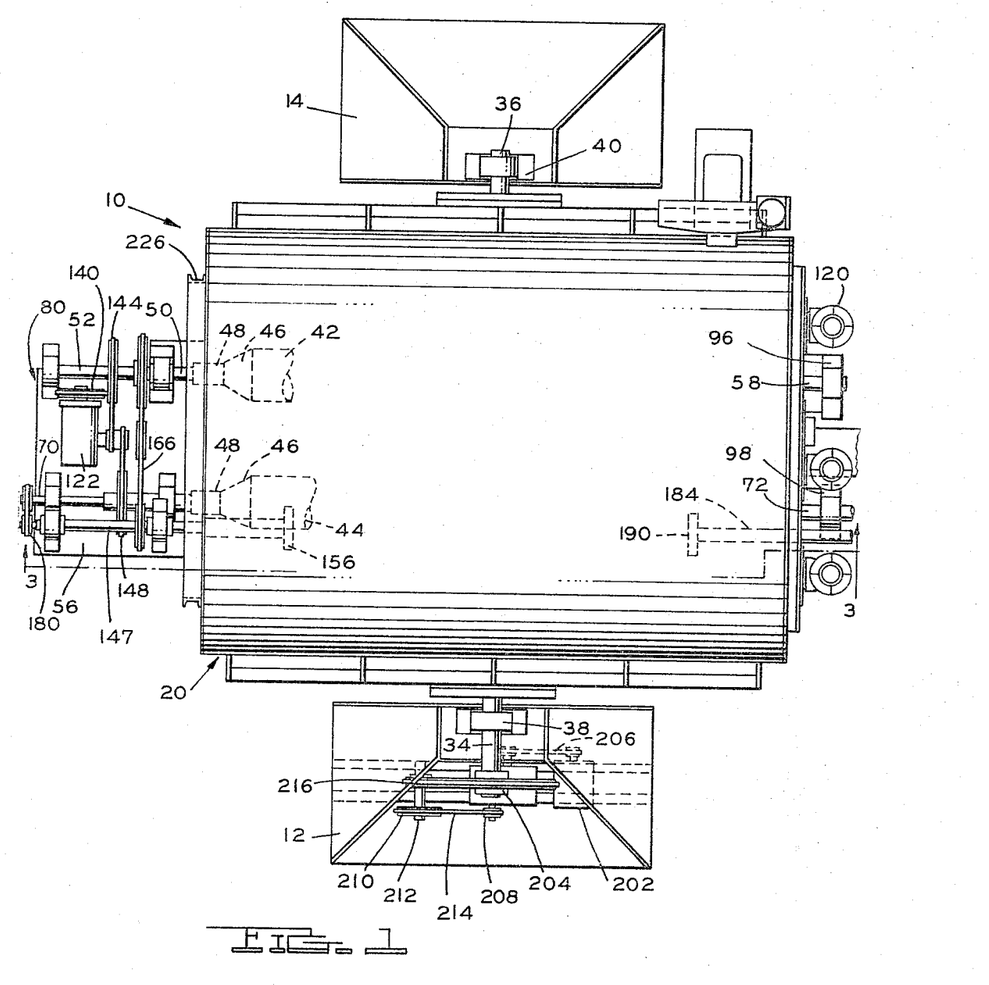
FIGURE 1 is a plan view of the automated heat treating apparatus or furnace designed to handle relatively small parts, with a portion of the apparatus removed.
Figure 3:
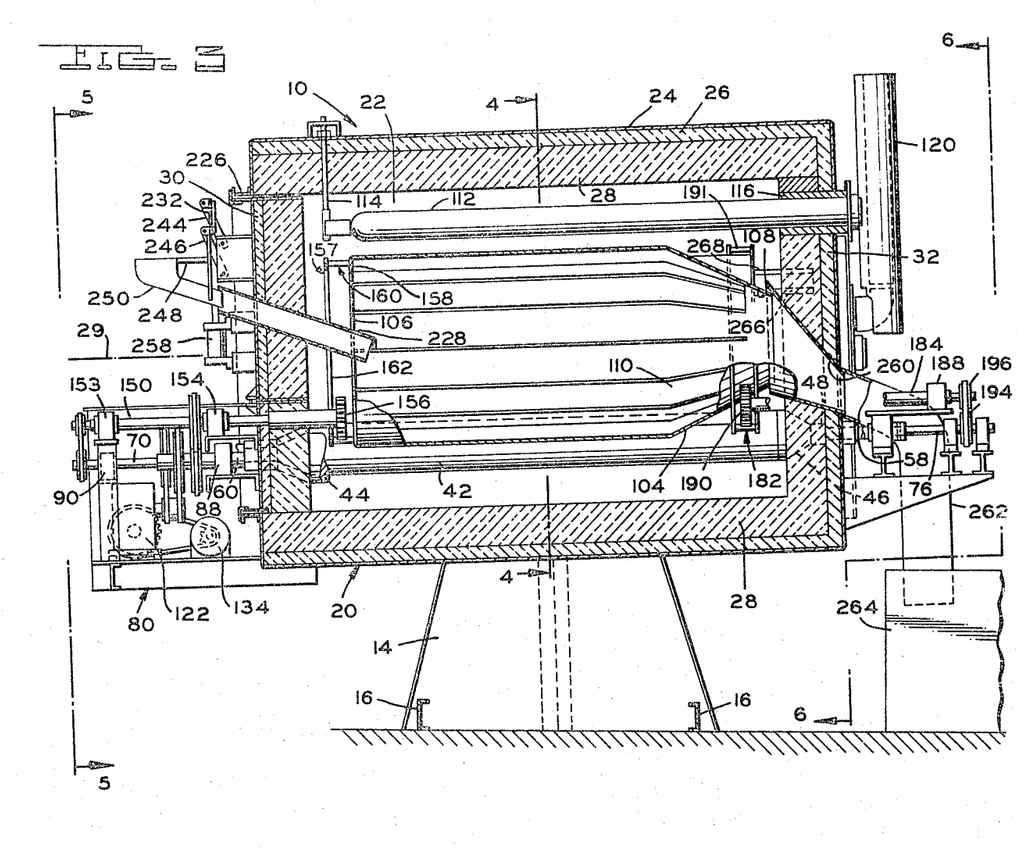
FIGURE 3 is a longitudinal sectional view through the heat treating apparatus taken substantially on the line 3—3 of FIGURE 1.

The right end of roller 42, as illustrated in FIGURES 1 and 3, is provided with a single tubular extension 58 which is connected to the collar 48 of roller 42 in a manner similar to extension 50 provided on the right end of the roller.

Figure 11:
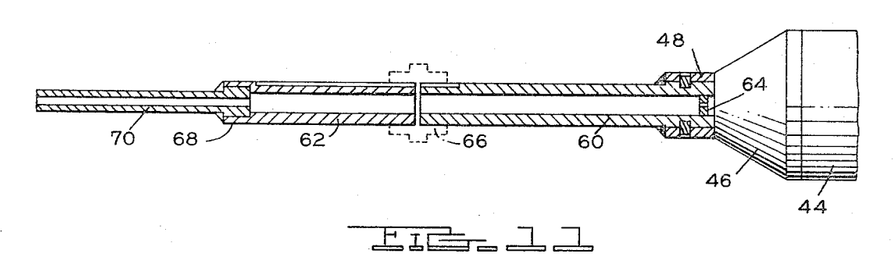
FIGURE 11 is a fragmentary elevation, partly in section, of the right-hand roller and its extension.

The left end of roller 44 as illustrated in FIGURES 8 and 11 is provided with a pair of axially aligned tubular extensions 60 and 62 of diameters less than roller 44. The right end of extension 60 is appropriately mounted in and secured to collar 48 and is provided on the interior thereof with a plug 64. The extension 62 is made in two tubular parts 68 and 70, with part 70 being of a diameter less than part 62. The right end of tubular part 70 is received in a recess in tubular part 68 and appropriately secured thereto by welding. The right end of diameter 62 is connected to and aligned with extension 60 by means of a coupling 66.

Figure 2:
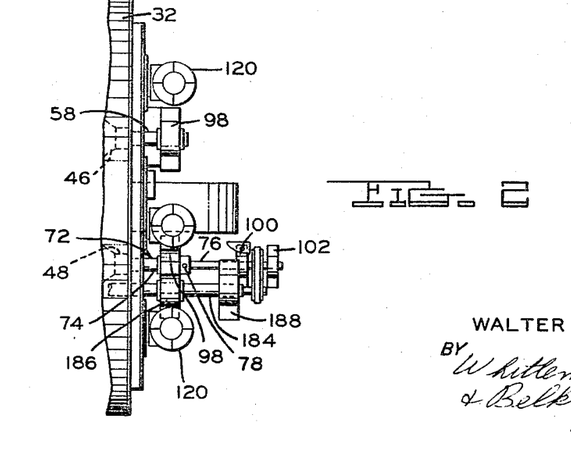
FIGURE 2 is a plan view of the right-hand edge portion of the apparatus, a part of which is not shown in FIGURE 1.
Figure 12:
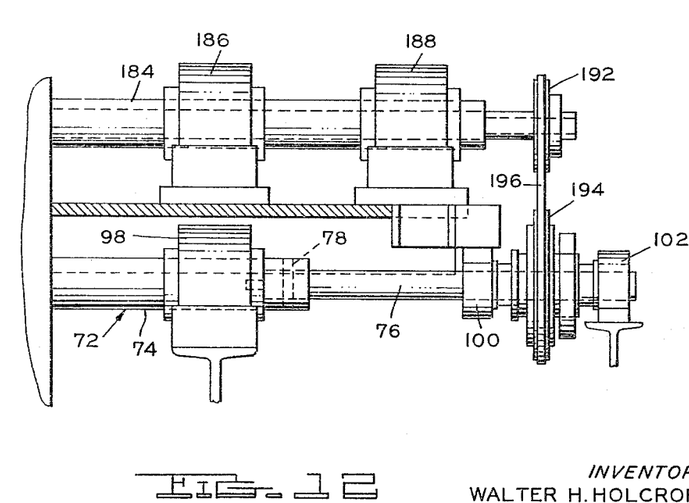
FIGURE 12 is an elevation of the right-hand edge portion of the apparatus shown in FIGURES 1–3 inclusive, with certain parts removed to illustrate features of the invention.

The right end of roller 44 as illustrated in FIGURES 2 and 12 is provided with a tubular extension 72 which is connected to the collar 48 of roller 44 in a manner similar to the extension 60 provided on the left end of roller 44. The extension 72 is made in two tubular parts 74 and 76, with part 76 being of less diameter than part 74 and connected thereto by means of a pin 78.

The roller extensions on the left end of each of the rollers 42 and 44 as viewed in FIGURES 10 and 11 respectively are split so as to minimize breakage of the extensions due to the drive mechanism. The shaft or extension couplings 56 and 66 each permit some misalignment between the corresponding extensions.

Figure 9:
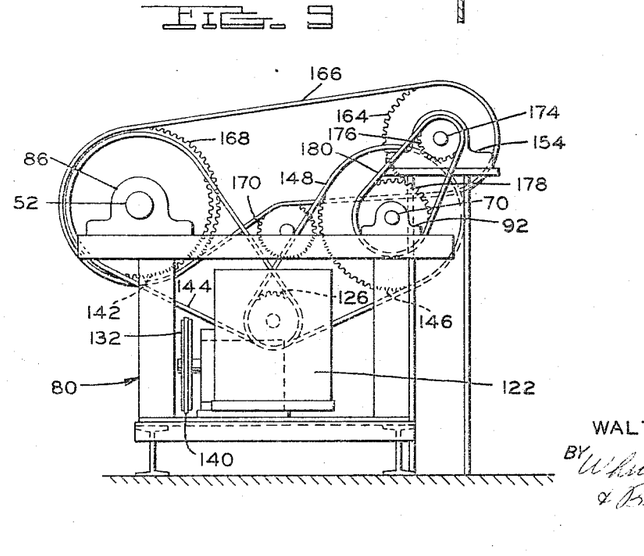
FIGURE 9 is a front elevation of the apparatus looking in the direction of arrows 9—9 of FIGURE 8.

The apparatus includes on the charge or loading end of the furnace 20 a series of structural channels and braces forming a frame or stand 80 for supporting the power operated drive mechanism and shaft bearings. The shaft extensions 50 and 52 of roller 42 are carried by three bearings 82, 84 and 86 as illustrated in FIGURES 8 and 9, mounted on the frame 80. The shaft extensions 60 and 62 of roller 44 are carried by three bearings 88, 90 and 92, mounted on the frame 80.

It should be observed that the rollers 42 and 44 and their extensions are arranged in parallel relationship, with the axis of roller 42 spaced slightly vertically above the axis of roller 44. The offset relationship between the axes of the rollers is indicated by the letter A in FIGURES 4 and 6.

The apparatus includes on the discharge or unloading end of the furnace 20 a series of structural braces forming a frame or stand 94 for supporting certain bearings and drive mechanism. The extension 58 of roller 42 is carried by a bearing 96 (FIGURES 1 and 2), mounted on the frame 94. The tubular parts 74 and 76 of the extension 72 of roller 44 are carried by three bearings 98, 100 and 102, mounted on the frame 94 as illustrated in FIGURES 1, 2 and 12.

An elongated substantially cylindrical alloy retort 104 is located entirely within the heating chamber 22 and is supported by the rollers 42 and 44. The retort 104 is provided with axially aligned openings 106 and 108 in the opposite ends thereof. Mounted within the retort 104 are a plurality of circumferentially spaced longitudinally extending internal sections or ribs 110 for engaging the parts within the retort 104 so that the parts may obtain a tumbling action during rotation of the retort 104 by the rollers 42 and 44. It should be noted that the retort 104 has a length less than the axial distance between the inner surfaces of the end walls 30 and 32, with the ends of the retort 104 spaced from the opposing end walls of the furnace 20.

Figure 4:
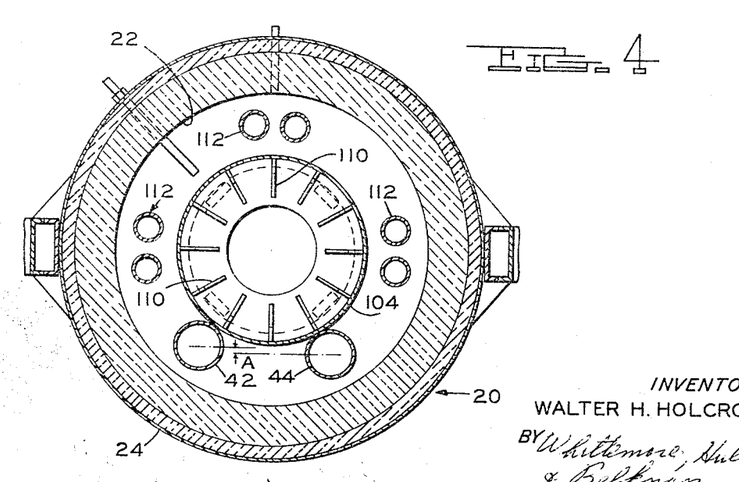
FIGURE 4 is a transverse sectional view through the heat treating apparatus taken substantially on the line 4—4 of FIGURE 3.
Figure 7:
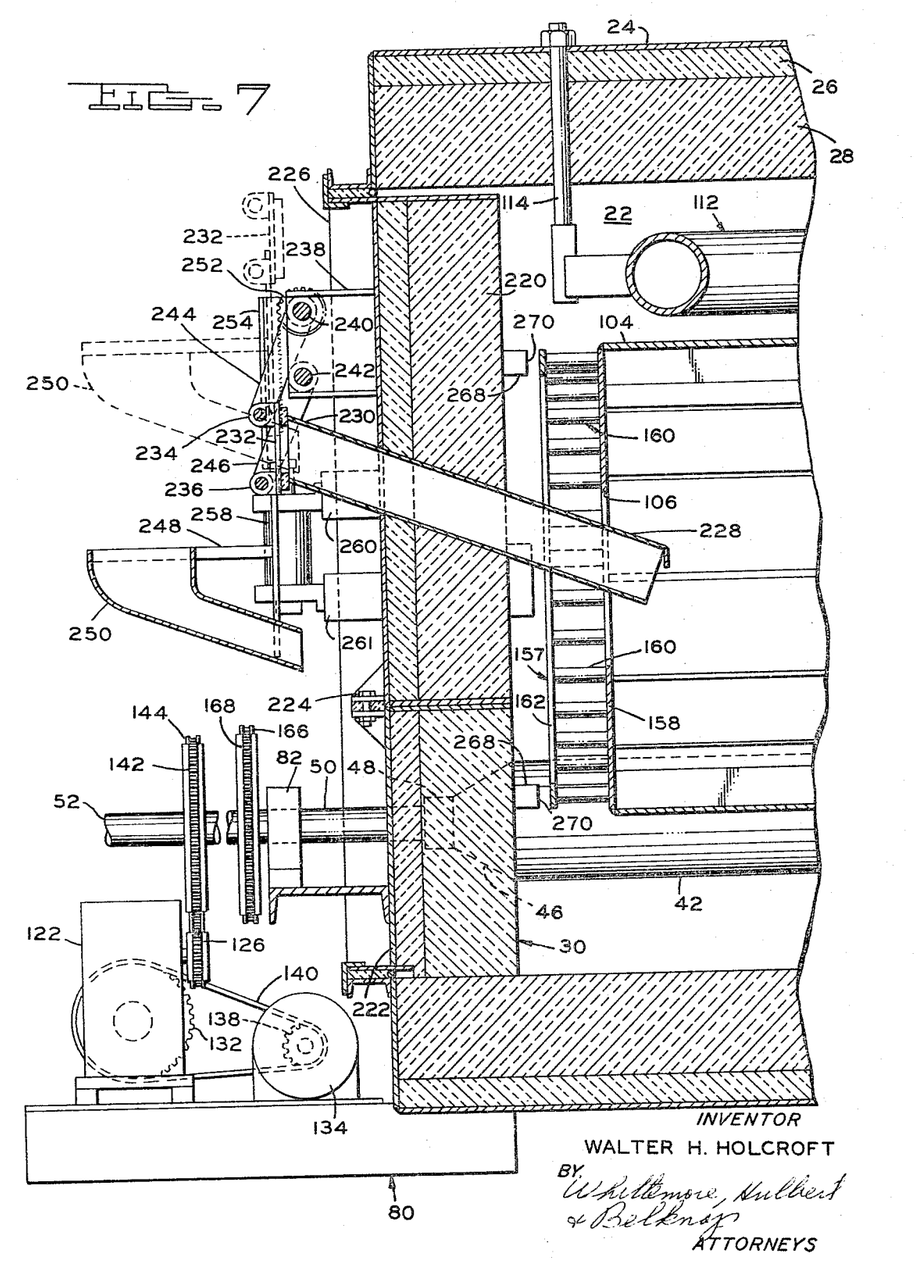
FIGURE 7 is an enlarged view of the front end portion or loading section of the heat treating furnace.

Appropriately mounted within the heating chamber 22 are a plurality of radiant U tubes or burners 112. FIGURE 4 of the drawings illustrates three burners 112, arranged at the top and sides of retort 104. However, it should be understood that the number of burners may be varied to suit different requirements. The U tubes or burners 112 per se are identical in construction and form no part of the present invention. Gas and air are introduced separately into each of the U tubes 112 and are progressively mixed by a controlled diffusion after they pass through the U tubes 112, thus providing an ideal luminous flame. The heating medium may be gas or oil. The U tubes 112 are heated by the flame and in turn radiate heat to the surrounding furnace walls and to the retort 104. Each U tube 112 is supported in the heating chamber 22 by a strap or bracket 114 (FIGURES 3 and 7). The legs of each U tube 112 extend through a tube spacing brick or refractory 116 carried by the rear end wall 32. Suitable connections 118 for gas and air are directed into the open end of one of the legs while the other leg is connected to an exhaust tube 120 as is well known in the art (see FIGURE 6). Thus the products of combustion from burners 112 are vented through the exhaust tubes 120.

The conttrolled gas atmosphere used in the heating chamber 22 may be one of any number of suitable types such as a gas with a high methane content. The gas atmosphere is directed into one or both ends of the heating chamber 22 by suitable piping not illustrated which is well known in the art.

A drive mechanism is mounted on the stand 80 (attached to the front end of furnace 20) for driving the rollers 42 and 44 to effect rotation of retort 104. The drive mechanism as best illustrated in FIGURES 8 and 9 includes a speed reducer 122 which is provided on one side thereof with a shaft 124 having thereon a pair of axially spaced tooth elements or sprockets 126 and 128. The reducer 122 is provided with an input shaft 130 having a sprocket 132 thereon. A drive motor 134 is provided with a shaft 136 having a sprocket 138 thereon. An endless drive chain or belt 140 connects sprockets 132 and 138.

Extension 52 of roller 42 is provided with a large sprocket or pulley 142 which is connected to sprocket 126 by a V-belt or chain 144. Extension 62 of roller 44 is provided with a large sprocket or pulley 146 which is connected to sprocket 128 by a V-belt or chain 148.

Energization of motor 134 is effective to drive sprocket 138, V-belt 140, sprocket 132, shaft 130 of reducer 122, and sprockets 126 and 128 which in turn drives V-belts 144 and 148 respectively. The V-belts 144 and 148 drive sprockets 142 and 146 respectively which is effective to drive rollers 42 and 44 in rotation. The rotation of rollers 42 and 44 frictionally drives the retort 104 supported thereon in rotation.

In the event slippage should occur between the rollers 42 and 44 and retort 104 an auxiliary or secondary drive mechanism is provided to drive the retort 104 in rotation. The secondary drive mechanism includes driving means adjacent both ends of the retort 104 for driving same.

The secondary driving means at the front end of retort 104 as illustrated in FIGURES 8 and 9 includes a rotatable shaft 150 on which is mounted an overrunning clutch 152. As an example, a Formsprag #HB-700 clutch may be utilized. The shaft 150 is carried by bearings 153 and 154, respectively, mounted on the frame 80. The shaft 150 extends through end wall 30 and is provided on the inner end thereof with a sprocket or gear 156 which is in meshed engagement with a rotary rack 157 attached to the front end plate 158 of the retort 104 as illustrated in FIGURES 3 and 7. The rotary rack 157 comprises a series of laterally extending circumferentially spaced rods or bars 160 attached on one end thereof to plate 158 and on the other end to the rim 162. The rotatable shaft 150 is arranged parallel to and is mounted above rollers 42 and 44 and their extensions as best illustrated in FIGURE 9.

The shaft 150 is provided with a sprocket 164 which is connected by a V-belt or chain 166 to a sprocket 168 mounted on extension 52 of roller 42. An idler sprocket 170 engages V-belt or chain 166 and is mounted on a bracket 172 connected to the frame 80. The idler 170 maintains the chain 166 relatively tight.

The shaft 150 includes an extension 174 of reduced diameter to which is connected a sprocket 176. A torque-tamer or friction clutch 178 is mounted on the extension 62 of roller 44 and is provided with a sprocket which is drivenly connected to sprocket 176 by a V-belt or chain 180. As an example, a Dodge size 50 Torque-Tamer may be utilized as is described in the Engineeering Catalog D-62 (85-1) of the Dodge Manufacturing Corporation of Mishawaka, Indiana.

The torque-tamer 178 is in effect an adjustable torque controlling clutch designed to slip when the pre-set torque limit is reached. The pre-set torque limit is reached when slippage occurs between the rollers 42 and 44 and retort 104. The Formsprag clutch 152 is in effect an overrunning clutch provided with sprags. The clutch 152 is activated upon the attainment of the pre-set torque and thus drives only when the rollers 42 and 44 fail to drive retort 104. When the rollers 42 and 44 drive the retort 104 the clutch 152 overruns and thus does not provide an effective driving force.

The purpose of the torque-tamer 178 is to drive the gear 156 through the drive connection including sprocket 176 and belt 180 at a speed sufficient to keep the teeth of gear 156 in contact or properly meshed engagement with the teeth of the rotary rack 157 and thereby prevent the retort 104 from reversely driving gear 156. With such a construction the torque-tamer 178 adds a relatively small driving force to the retort 104. When the rollers 42 and 44 are driving, torque-tamer 178 is turning shaft 150 and gear 156 at a faster speed than clutch 152.

When the slippage occurs between rollers 42 and 44 and the retort 104, the torque builds up and the torque-tamer 178 slips due to the fact that it cannot drive the retort 104 alone. At such time the Formsprag clutch 152 is activated through the drive connection including sprockets 164 and 168 and the chain 166 as illustrated in FIGURES 8 and 9 to drive gear 156 under a drive force sufficient to rotate retort 104 at a predetermined speed which is slightly less than the retort speed imparted by the rollers.

When the retort 104 is being driven by the rollers 42 and 44, as an example, at 1 r.p.m. the Formsprag clutch 152 is overunning since it is only capable of driving retort, as an example, at .9 r.p.m. The torque-tamer 178, however, is rotated at a speed sufficient to keep the teeth thereon in meshed engagement with the rotary rack 157 and to supply some additional driving force to retort 104 which supplements the driving force of the rollers 42 and 44. When slippage occurs, the Formsprag clutch is activated to drive retort 104 at .9 r.p.m.

Once the torque decreases to a point below the pre-set limit, the rollers 42 and 44 and torque-tamer 178 once again take over the driving of retort 104.

The discharge end of retort 104 is provided with a rotary rack 182 similar in construction to rack 157 as shown in FIGURE 3. FIGURES 2, 3 and 12 illustrate a shaft 184 extending through the end wall 32 of the furnace 20 and supported on the outer end thereof by bearings 186 and 188. The inner end of shaft 184 is provided with a gear 190 which is in meshed engagement with the teeth 191 of rack 182. The outer end of shaft 184 at a point beyond bearing 188 is reduced in diameter and has a sprocket 192 mounted thereon.

The extension 76 of roller 44 has a torque-tamer or friction clutch 194 provided with a sprocket mounted thereon which is connected to sprocket 192 by a V-belt or chain 196. Thus rotation of roller 44 is effective to positively drive friction clutch 194 and hence belt 196, pulley 192, shaft 184 and in turn gear 190 which drives the retort 104 through rack 182. The gear 190 is continuously driven by the friction clutch 194 from roll 44. Torque-tamer 194 is adjustable and adds a percentage of the drive required to rotate retort 104. As an example a Dodge size 70 Torque-Tamer may be utilized as identified in the catalog of the Dodge Manufacturing Corporation previously mentioned. With such a construction torque-tamer 194 is operative and adds driving force when either the rollers 42 and 44 or the Formsprag clutch 152 do the driving.

As mentioned previously, means are provided for changing the inclination of the furnace 20. The trunnion 34 is provided on the outer end thereof with a sprocket 200. A drive motor 202 is mounted in between the flanges of the pedestal 12. The shaft of the motor 202 is connected to the reducer 204 by means of a silent chain drive 206. A sprocket 208 is rotatably carried by the reducer 204 and is connected to a sprocket 210 mounted on shaft 212 by means of a chain 214. Shaft 212 is also provided with a sprocket 216 which is operatively connected to the trunnion sprocket by means of a drive chain 218.

The drive mechanism for the furnace 20 is constructed and arranged to gradually change the inclination of the furnace. As an example, the furnace 20 is tilted 30° from the horizontal in approximately fifteen minutes. Inasmuch as the over all structure or apparatus is effectively balanced, the power for the drive mechanism is minimal.

The front wall 30 of the furnace 20 includes a removable upper section 220 and a lower section 222 through which the rollers 42 and 44 extend. The two sections 220 and 222 when assembled are connected by a plurality of bolts 224. The furnace 20 includes on the outer surface thereof an annular rim 226. Mounted in the removable upper section 220 is a downwardly extending loading or charge chute 228 which extends through the opening in the rack 157 and the opening 106 in end plate 156 into the interior of the retort 104. The outer end of chute 228 extends outwardly beyond section 220 and through rim 226 as indicated by the numeral 230.

Means including a door 232 are provided for opening and closing the outer end 230 of the charge chute 228. The door 232 is provided on the upper end thereof with lugs 234 and 236. A bracket 238 connected to section 220 is provided with pivots or pins 240 and 242. A first pair of laterally spaced links 244 are connected on the upper end thereof to pin 240 and on the lower end thereof to lugs 234. A second pair of laterally spaced links 246 are connected on the upper end thereof to pivot pin 242 and on the lower end thereof to lugs 236.

Figure 5:
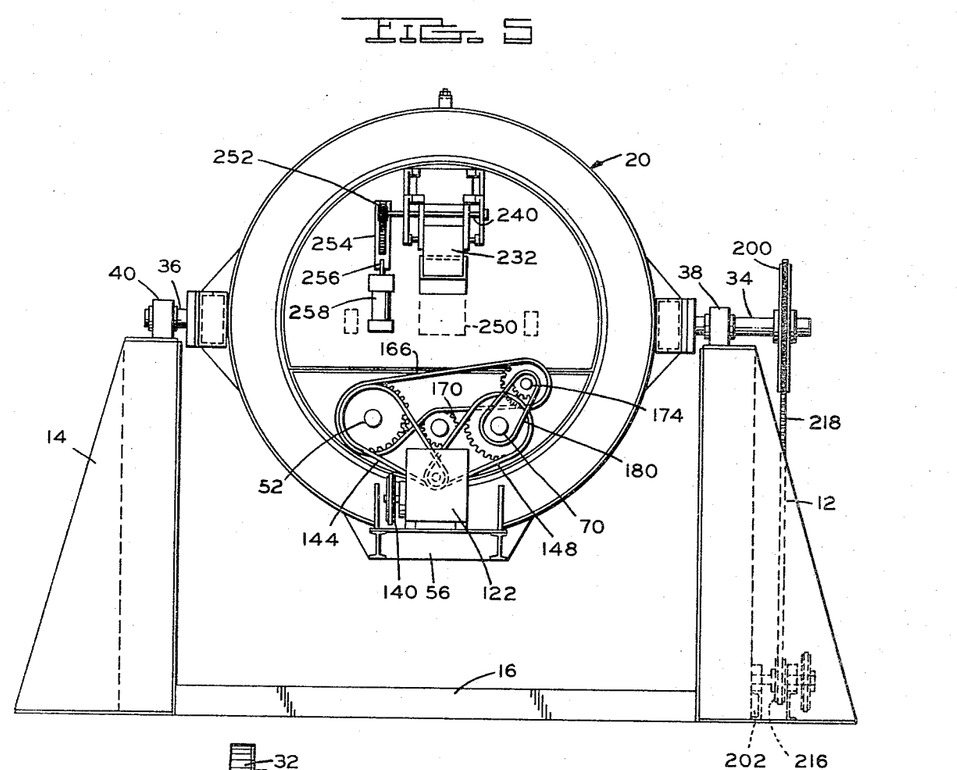
FIGURE 5 is a front end view of the heat treating apparatus looking in the direction of arrows 5—5 of FIGURE 3.

The door 232 is provided with a support 248 for an auxiliary charge chute 250 which is adapted to be inserted in charge chute 228 as illustrated in dotted lines in FIGURE 7. The upper pivot pin 240 is provided on one end thereof with a gear 252 engageable with a rack 254. The rack 254 is attached on the lower end thereof to the piston rod 256 of the air cylinder or motor 258 as illustrated in FIGURE 5. The fluid motor 258 is carried by lugs 260 and 261 which are connected to the upper wall section 220. Energization of the fluid motor 258 is effective to move rack 254 in a straight line which results in rotation of gear 252 and pivot pin 240. Rotation of pin 240 is effective to swing links 244 and 246 in an arc to raise or lower door 232 and the auxiliary chute 250. In operation at a predetermined time, door 232 opens inserting auxiliary chute 250 in the fixed charge chute 228 as illustrated in dotted lines in FIGURE 7. A traveling hopper, not shown, with a predetermined weight of material will discharge through chutes 250 and 228 into the rotating retort 104.

The discharge end of retort 104 is opened and extends into a discharge chute 260 (FIGURE 3) fixedly carried by the rear end wall 32 of furnace 20. The fixed chute 260 extends downwardly and is connected to a chute 262 which extends into a quench tank 264. Chutes 260 and 262 connect the retort 104 with the quenching medium thus providing an effective gas seal at the discharge end.

The inner surfaces of the furnace walls 30 and 32 are provided with a plurality of recesses 266 in which are located oppositely extending substantially equally spaced elements or bumpers 268. The bumpers 260 are constructed from suitable heat resistant material such as silicon carbide, a refractory or an alloy. The bumpers 268 are provided with abutment engaging surfaces 270 arranged to engage the opposing ends of the retort 104 to prevent the retort 104 from contacting the end walls 30 and 32 during inclination of the furnace 20. As mentioned previously, the retort 104 has a length less than the distance between the end walls 30 and 32. The bumpers 268 thus prevent excessive lengthwise sliding of the retort 104 and maintain the retort 104 in predetermined spaced relationship with respect to the end walls 30 and 32.

The apparatus just described is particularly adapted for automation. The control panels and the various electrical, motor, gas and air control circuits for automating furnace 20 are not shown. It is sufficient to say that all of the operations required of furnace 20 are performed automatically according to a predetermined timed sequence and include the following:

(1) Control means for introducing and maintaining and/or varying a proper mixture of atmosphere gases into the retort 104 and the gas tight heating chamber 22. The atmosphere enters retort 104 to completely envelop the parts to be heat treated.

(2) Control means for introducing and maintaining the proper proportions of gas and air in the radiant U tubes or burners 112.

(3) Control means for energizing the drive mechanism for the rollers or rolls 42 and 44 and for the secondary retort drive mechanism.

(4) Control means for energizing the fluid motor 258 to open the door 232 and connect the auxiliary chute 250 to the charge chute 228.

(5) Control means for closing the door 232 after the parts to be heat treated have been inserted through chutes 250 and 228 into the rotating retort 104 to provide a gas tight heating chamber 22.

(6) Control means for automatically energizing the drive mechanism for tilting the furnace 20 upon completion of the heat treating cycle so as to discharge the heat treated parts into the quench tank 264.

(7) Control means for returning the furnace 20 to a substantially horizontal position.

(8) Control means for removing treated parts from quench tank 264.

In operation, prior to charging the retort 104 the furnace 20 is brought to the position illustrated in FIGURE 3. The rollers 42 and 44 are driven automatically to effect rotation of the retort 104. In addition the torque-tamer 178 adds some driving force to retort 104 as explained previously while clutch 156 is overrunning. The motor 258 is automatically energized so as to raise the door 232 and to insert the auxiliary chute 250 into the charge chute 228. Thereafter a loader, not shown, which contains a predetermined weight of material, as an example, relatively small roller bearings or ball bearings, is automatically brought into contact with the chute 250. Thereafter the parts are discharged from the loader through the chutes 250 and 228 into the rotating retort 104.

Upon completion of the loading cycle the auxiliary chute 250 is removed and the door 232 is automatically returned to a closed position as illustrated by the solid lines in FIGURE 7 to insure a substantially gas tight heating chamber 22. The rotation of the retort 104 is effective to tumble the parts therein. The gas atmosphere which is directed into the heating chamber 22 through various pipes, not shown, surrounds the retort 104 and also enters the retort 104 through the openings 106 and 108 provided at the opposite ends thereof. After the parts have been properly heat treated according to a predetermined timed cycle the furnace 20 is automatically tilted gradually, approximately 30° in fifteen minutes, so as to discharge the treated parts through the discharge chutes 260 and 262 into the quench tank 264 where the parts are removed automatically by conventional means not shown. While the furnace 20 and retort 104 are undergoing a change in axial inclination the retort 104 is simultaneously undergoing rotation to provide continual tumbling of the parts being heat treated.

In the event that slippage should occur between the rollers 42 and 44 and the retort 104, usually as a result of the load in the retort 104, the torque-tamer 178 slips and as a result thereof the Formsprag clutch 152 is activated as mentioned previously to positively drive the retort 104 in rotation through means of the gear 156 and rack 157. Before as well as after slippage occurs, torque-tamer 194 drives the gear 190 and rack 182 provided on the back end of retort 104.

From the foregoing description it will be seen that the instant invention has, among others, the following differences and advantages over conventional heat treating apparatuses:

(1) The retort is located entirely within the heating chamber and is not limited as to size.

(2) Primary and secondary driving means are provided for rotating or oscillating the retort. Thus, the secondary driving means is operative to drive the retort upon failure of the primary driving means for any reason.

(3) The combination of the rolls, rotary rack, sprocket and overrunning clutch provide positive rotation of the retort regardless of load.

(4) The heat treating apparatus is completely automated and thus offers all the advantages of a continuous operation without any of the disadvantages thereof while retaining features of a batch furnace.

(5) The automated heat treating apparatus is adapted for carburizing or carbo nitriding or other heat treating processes.

(6) The heat treating apparatus provides a rotary retort with internal ribs which has advantages over a retort with an internal screw. The internal ribs facilitate tumbling of and mixing of the parts to be heat treated.

(7) The composition of the gas atmosphere can be varied during the heat treating cycle in a controlled manner.

(8) The temperature may be varied so as to lower the temperature in the furnace before quenching the heat treated parts.

The retort 104 is made from an appropriate metal alloy which is formed into the desired illustrated configuration and then welded together at the mating edges. In addition, the end plate 158 is welded to the retort 104. The ribs 110 of the retort 104 are also made from an appropriate metal alloy which are secured to the walls of the retort housing by welding. The retort 104 of the present invention has a wall thickness of approximately ¼" to ⅜" while the prior art retorts are each generally more than ¾" thick. The substantial reduction in wall thickness is due to the fact that the retort 104 is not arranged in the furnace 20 as a structural member as are the prior art retorts.

The rollers or rolls 42 and 44 are made from alloy or a suitable refractory material. It should be understood that electric heating elements may be utilized in the furnace 20 in place of the burners 112 as is well known in the art. A suitable motor driven fan, not shown, may be provided in the chamber 22 for circulating the furnace atmosphere around the burners 112 as well as through the open ends of the retort 104 so as to thoroughly direct the atmosphere around and through the parts or articles being processed in the retort 104.

It should also be understood that various types of overrunning clutches may be utilized such as the Formsprag clutch mentioned previously or the clutch illustrated in the C. H. Martin Patent 2,780,454, entitled, "Work Conveyor for Heat Treating Furnaces," which issued on Feb. 5, 1957, assigned to the assignee of record.

The drawings and the foregoing specification constitute a description of the improved batch type rotary barrel gas atmosphere furnace in such full, clear concise and exact terms as to enable any person skilled in the art to practice the invention, the scope of which is indicated by the appended claims.

What I claim as my invention is:

1. In an apparatus for heat treating parts in a controlled atmosphere, the combination of a substantially gas tight heating chamber having enclosing walls including opposite end walls defining the lengthwise extent of said chamber, a cylindrical retort of a length less than the distance between said end walls located and supported entirely within said chamber, rollers beneath said cylindrical retort for rotatably supporting the same, said rollers having means for rolling supporting contact for substantially the entire length of said cylindrical retort first means for rotating said rollers to thereby frictionally drive said retort, and independent second means independent of said rotating rollers for driving said retort in rotation upon slippage occurring between said retort and said first means.

2. The apparatus defined in claim 1 wherein said first means is outside said gas tight heating chamber and said rollers constitute the sole support for said rotatable cylindrical retort in said chamber.

3. In an apparatus for heat treating parts in a controlled atmosphere, the combination of a substantially gas tight heating chamber having enclosing walls including opposite end walls defining the lengthwise extent of said chamber, a retort of a length less than the distance between said end walls located and supported entirely within said chamber, first means for frictionally driving said retort in rotation, and second means for driving said retort in rotation upon slippage occurring between said retort and said first means, said second means comprises a rotary rack attached to said retort and a sprocket mounted in said chamber in meshed engagement with said rack.

4. In a heat treating apparatus for heating treating parts in a controlled atmosphere, the combination of a base, a substantially gas tight heating chamber, means pivotally mounting said chamber on said base, a metallic cylindrical retort located and supported entirely within said chamber, means mounting said retort for rotation including rollers beneath said cylindrical retort for rotatably supporting the same, said rollers having rolling supporting contact for substantially the entire length of said cylindrical retort, means outside said heating chamber for rotating said rollers to thereby cause rotation of said cylindrical retort, independent second means independent of said rotating rollers for driving said cylindrical retort in rotation upon slippage occurring between said retort and said roller rotating means and power operated means for tilting said chamber with respect to said base.

5. In a furnace for heat treating parts in a controlled atmosphere, the combination of a base, a substantially gas tight heating chamber pivotally mounted on said base, said chamber having enclosing walls including opposite end walls defining the lengthwise extent of said chamber, a metallic cylindrical retort of a length less than the distance between said end wall located and supported entirely within said chamber with the opposite ends thereof spaced from said end walls, first means for frictionally driving said retort in rotation, second means for driving said retort in rotation upon slippage occurring between said retort and said first means, and power operated means for tilting said chamber with respect to said base.

6. The furnace defined in claim 5 wherein said first means comprises a rotatable support mounted in said chamber in friction driving engagement with said retort, said rotatable support forming the sole support for said retort in said chamber.

7. The furnace defined in claim 5 wherein said second means comprises a rotary rack attached to one end of said retort in the space between said one end and the opposite end wall of said retort and a sprocket mounted in said chamber in meshed engagement with said rack.

8. A heat treating furnace comprising a base, a substantially gas tight heating chamber having enclosing walls including opposite end walls defining the lengthwise extent of said chamber, means rotatably mounting said chamber on said base, means for tilting said chamber about said mounting means, a metallic cylindrical retort of less than the distance between said end walls and having its opposite ends within said heating chamber, rollers beneath said cylindrical retort for supporting and frictionally driving same in rotation, means outside of said heating chamber for rotating said rollers to thereby cause rotation of said retort, said retort being provided with internal sections for engaging the parts within the retort to thereby obtain a tumbling action during rotation, and a discharge chute for said chamber extending downwardly into a quench tank below said heating chamber.

9. A heat treating furnace comprising a base, a substantially gas tight heating chamber having enclosing walls including opposite end walls defining the lengthwise extent of said chamber, means rotatably mounting said chamber on said base, means for tilting said chamber about said mounting means, a metallic cylindrical retort of less than the distance between said end walls and having its opposite ends within said heating chamber, rollers beneath said cylindrical retort for supporting and frictionally driving same in rotation, means outside of said heating chamber for rotating said rollers to thereby cause rotation of said retort, said retort being provided with internal sections for engaging the parts within the retort to thereby obtain a tumbling action during rotation, a discharge chute for said chamber extending downwardly into a quench tank below said heating chamber, and means for driving said retort in rotation upon slippage occurring between said retort and rollers.

10. The furnace defined in claim 9 wherein said second means comprises a rotary rack attached to said retort and a sprocket mounted in said chamber in meshed engagement with said rack.

11. The furnace defined in claim 9 wherein a pair of said rollers are provided, said rollers extending lengthwise of said chamber and having the opposite ends thereof rotatably supported at points outside of said chamber, said rollers providing the sole support for said retort.

12. The furnace defined in claim 9 wherein said second means comprises rotary racks attached to opposite ends of said retort, and sprockets mounted in said chamber in meshed engagement with said racks.

13. In a furnace for heat treating parts in a controlled atmosphere, the combination of a substantially gas tight heating chamber having enclosing walls including opposite end walls defining the lengthwise extent of said chamber, a metallic cylindrical retort of a length less than the distance between said end walls and having its opposite ends within said heating chamber, rollers beneath said cylindrical retort which provide the sole support for said retort, means outside said heating chamber for rotating said rollers to thereby frictionally drive said retort in rotation, said retort being provided with internal sections for engaging the parts within the retort to thereby obtain a tumbling action during rotation, a discharge chute from said chamber extending downwardly into a quench tank below said heating chamber, and means for driving said retort in rotation upon slippage occurring between said retort and said rollers.

14. The furnace defined in claim 13 wherein said last mentioned means comprises a rack attached to each end of said retort and a sprocket mounted in said chamber in meshed engagement with each rack.

15. The furnace defined in claim 14 wherein said chamber is pivotally mounted on a base, and power operated means for tilting said chamber with respect to said base.

16. In a furnace for heat treating parts in a controlled atmosphere, the combination of a substantially gas tight heating chamber having enclosing walls including opposite end walls defining the lengthwise extent of said chamber, a pair of rollers extending lengthwise through said chamber and said end walls, a retort in said chamber rotatably supported by said rollers, primary drive means operatively connected to said rollers for rotating said rollers and thereby frictionally driving said retort in rotation, a shaft extending through one of said end walls, a gear on the inner end of said shaft, a rotary rack attached to the end of said retort opposite said one end wall in meshed engagement with said gear, said shaft including two parts connected by an overrunning clutch, said clutch being effective to drive said gear to effect rotation of said rack and retort upon slippage occurring between said retort and said rollers.

17. The furnace defined in claim 16 wherein clutch means is interposed between one of said rollers and said shaft to rotate said gear at a speed sufficient to maintain said gear in meshed engagement with said rack, said clutch means being adapted to slip when said overrunning clutch is activated.

18. The furnace defined in claim 17 wherein said clutch means includes a sprocket and is mounted on said one roller, a sprocket on said shaft, and an endless belt between said sprockets, said clutch means being effective to add some drive force to said gear and rack which supplements the driving force of said rollers.

19. The furnace defined in claim 18 wherein a shaft extends through the other of said end walls, a rotary rack attached to the other end of said retort opposite said other end wall, a gear on the inner end of said last mentioned shaft in meshed engagement with the corresponding rack, and a clutch mechanism interposed between said one roller and said last mentioned shaft effective to rotate the gear provided thereon at a speed sufficient to maintain the gear in meshed engagement with said rack.

20. The furnace defined in claim 19 wherein said clutch mechanism is constructed and arranged to continuously drive said last mentioned gear regardless of whether said primary drive means or said overrunning clutch is supplying the driving force to said retort.

References Cited by the Examiner
UNITED STATES PATENTS

| | | | |
|---|---|---|---|
| 822,460 | 5/1906 | Machlet | 263—34 |
| 2,488,653 | 11/1949 | Andree et al. | 263—34 |
| 3,176,970 | 4/1965 | Holcroft | 266—4 |

FREDERICK L. MATTESON, Jr., *Primary Examiner.*

JOHN J. CAMBY, *Assistant Examiner.*